US008544561B2

(12) United States Patent
Aihara

(10) Patent No.: US 8,544,561 B2

(45) Date of Patent: Oct. 1, 2013

(54) DRIVING TOOL AND BUMPER OF DRIVING TOOL

(75) Inventor: Yasunori Aihara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 48 days.

(21) Appl. No.: 12/823,312

(22) Filed: Jun. 25, 2010

(65) Prior Publication Data

US 2010/0327040 A1 Dec. 30, 2010

(30) Foreign Application Priority Data

Jun. 29, 2009 (JP) ................................ 2009-154398

(51) Int. Cl.

| | |
|---|---|
| ***B25D 17/11*** | (2006.01) |
| ***B25D 17/24*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***B23B 45/16*** | (2006.01) |

(52) U.S. Cl.

USPC ........................................ 173/162.1; 173/210

(58) Field of Classification Search

USPC ............... 227/130, 132, 134; 173/162.1, 210

See application file for complete search history.

(56) References Cited

U.S. PATENT DOCUMENTS

| | | | | |
|---|---|---|---|---|
| 3,651,740 | A * | 3/1972 | Perkins | 91/417 A |
| 3,673,922 | A * | 7/1972 | Doyle | 91/422 |
| 3,796,270 | A * | 3/1974 | Lange | 173/15 |
| 3,815,475 | A * | 6/1974 | Howard et al. | 91/399 |
| 4,117,767 | A * | 10/1978 | Elliesen | 91/461 |
| 4,348,015 | A * | 9/1982 | Domer | 267/140.4 |
| 4,784,308 | A * | 11/1988 | Novak et al. | 227/130 |
| 5,027,910 | A * | 7/1991 | Honsa et al. | 173/162.2 |
| 5,131,579 | A * | 7/1992 | Okushima et al. | 227/8 |
| 5,437,339 | A * | 8/1995 | Tanaka | 173/210 |
| 5,441,192 | A * | 8/1995 | Sugita et al. | 227/130 |
| 5,715,982 | A * | 2/1998 | Adachi | 227/8 |
| 5,865,360 | A * | 2/1999 | White | 227/130 |
| 5,878,936 | A * | 3/1999 | Adachi et al. | 227/130 |
| 5,896,933 | A * | 4/1999 | White | 227/130 |
| 6,003,751 | A * | 12/1999 | Ohmae | 227/130 |
| 6,779,699 | B2 * | 8/2004 | Aoki et al. | 227/130 |
| 7,131,563 | B2 * | 11/2006 | Wen | 227/130 |
| 7,931,180 | B2 * | 4/2011 | Lai | 227/8 |
| 2009/0230166 | A1 * | 9/2009 | Yamamoto et al. | 227/130 |
| 2010/0243286 | A1 * | 9/2010 | Hoshino et al. | 173/211 |
| 2011/0000949 | A1 * | 1/2011 | Ito et al. | 227/138 |

FOREIGN PATENT DOCUMENTS

| | | | |
|---|---|---|---|
| EP | 1 033 497 | A2 | 9/2000 |
| EP | 1918074 | A1 * | 5/2008 |
| EP | 2103387 | A1 * | 9/2009 |
| JP | 07-017481 | | 3/1995 |
| JP | 07-241783 | | 9/1995 |
| JP | 08-336776 | | 12/1996 |
| JP | 2007-69293 | A | 3/2007 |
| JP | 2007-69345 | A | 3/2007 |
| JP | 2007-075957 | | 3/2007 |
| WO | WO 2007010959 | A1 * | 1/2007 |
| WO | WO 2008/149902 | A1 | 12/2008 |

* cited by examiner

*Primary Examiner* — Robert Long

(74) *Attorney, Agent, or Firm* — Drinker Biddle & Reath LLP

(57) ABSTRACT

A bumper of a driving tool has a cylindrical overall shape and also has a space portion expanding downward therein. The bumper is provided with an upper portion, an intermediate portion, and a lower portion. A normal inclined-surface, in which an outer diameter becomes larger from an upper end of a full height of the bumper toward a slightly upper position of the intermediate portion, is formed at a periphery of the upper portion. A bulging-out portion haying the largest outer diameter in the bumper is bulged out, at a periphery of the intermediate portion. A reverse inclined-surface, in which the outer diameter becomes smaller toward downward, is formed at the periphery of the lower portion.

4 Claims, 8 Drawing Sheets

DRIVING TOOL AND BUMPER OF DRIVING TOOL

BACKGROUND OF THE INVENTION

1. Field of the Invention

The present invention relates to a bumper for relaxing and absorbing an impact produced by driving a piston mainly in a driving tool such as a pneumatic tool or a gas combustion type driving tool, and also relates to the driving tool.

2. Related Art

For example, a driving tool which drives a piston by compressed air thereby to drive a fastener such as a nail, a drive screw, a staple, or the like by a driver connected to the piston and drive out the fastener toward a member to be driven is provided with a cushioning mechanism for absorbing an impact of a piston. This cushioning mechanism is constituted by a cylindrical bumper which is usually disposed below a cylinder, receives a lower surface of the piston, and absorbs the impact of the piston.

As such the bumper, Patent Document 1 discloses a bumper in which an inner diameter and an outer diameter of a lower portion is made larger than an inner diameter and an outer diameter of an upper portion, a large space is formed on an inside of the bumper lower portion, and a clearance between a driver and a driver guide hole is made small. In this bumper, the clearance is closed when the impact of the piston is applied, thereby to compress the air trapped in the lower space, and an absorption effect of the impact is enhanced by means of synergy between the elasticity of the bumper and air cushion.

Patent Document 2 discloses a hollow-cylindrical bumper which has an external shape that an outer diameter of a bumper upper portion is small and an outer diameter of a bumper lower portion is large. This bumper has an inner diameter of a hollow part in which a lower inner diameter is larger than an upper inner diameter, so as to form an air-gap portion. From this air-gap portion, a deformation of the compressed bumper can escape and the deformation in the compressed direction is promoted, whereby an impact-absorption advantage of a piston is enhanced.

Patent Document 3 discloses a vertically-long and cylindrical bumper. In this bumper, an upper portion is thick and its outer diameter is made substantially the same as the inner diameter of a housing. An intermediate portion bulges so as to follow a bulging-out inner peripheral surface of a lower portion of the housing. A bumper lower portion is formed thin and provided with an air gap. Thereby, the bumper lower portion is easy to deform, and this deformed portion is escaped into the air gap thereby to enhance an impact absorption advantage of a piston.

[Patent Document 1] JP-A-08-336776

[Patent Document 2] JP-A-07-241783

[Patent Document 3] JP-U-07-017481

The bumpers described in the above-mentioned Patent Documents 1 to 3 are so designed as to receive the lower surface of the piston driven by high air pressure or high combustion pressure at an upper chamber of a cylinder, and to absorb the impact at the bumper upper portion or the bumper lower portion. In any of the bumpers, the upper portion is asymmetric in shape to the lower portion, and the deformation by flexure produced upon reception of the impact tends to concentrate on the upper portion or the lower portion. Since such the structure instantaneously absorbs the impact and stress concentrates on only the deformed portion, only the deformed portion deteriorates. Namely, since the flexure at the upper portion and the flexure at the lower portion are not uniform, resultantly, a durability of the bumper locally lowers.

Further, at the lower portion of the cylinder, an exhaust port communicating with a blowback chamber is formed. When the piston is driven, the air compressed in a lower chamber of the cylinder is stored through the exhaust port in the blowback chamber. By feeding back the air in this blowback chamber from the exhaust port to the lower chamber of the cylinder, the piston which has descended up to a bottom dead center ascends up to a top dead center. Since the exhaust port is arranged at the cylinder portion corresponding to the outer portion of the bumper upper portion, every time the bumper is compressed upon reception of the impact by the piston and bulges outward, the bulging-out portion comes into strong contact with an opening end of the exhaust port. Therefore, during the repeat of the contact, the surface of the bumper is damaged, and the durability is impaired.

SUMMARY OF THE INVENTION

One or more embodiments of the invention provide a bumper of a driving tool such as a nailing machine which is wholly subjected to flexure upon reception of impact thereby to enable an impact-absorption and improvement of durability, and also the driving tool in which this bumper is accommodated and arranged.

In accordance with one or more embodiments of the invention, a bumper (20) of a driving tool (A), which has a cylindrical overall shape and also has a space portion (S) expanding downward therein, is provided with: an upper portion (b1); an intermediate portion (b2); and a lower portion (b3). A normal inclined-surface (23), in which an outer diameter becomes larger from an upper end of a full height of the bumper (20) toward a slightly upper position of the intermediate portion (b2), is formed at a periphery of the upper portion (b1). A bulging-out portion (21) having the largest outer diameter in the bumper (20) is bulged out, at a periphery of the intermediate portion (b2). A reverse inclined-surface (24), in which the outer diameter becomes smaller toward downward, is formed at the periphery of the lower portion (b3).

According to this structure, when the bumper is compressed from the upside, firstly, the upper portion is compressed up and down and readily undergoes outward flexural-deformation. Further, the intermediate portion, in which the bulging-out portion having the largest outer diameter is formed, is easy to undergo up-down compression-deformation. Further, since the outer diameter of the lower portion decreases gradually, the lower portion is easy to undergo the up-down compression-deformation and the outward flexural-deformation. Since the deformation by the compression is thus transmitted from the upper portion to the lower portion, as long as the bumper, when arranged in a cylinder, is accommodated so as not to obstruct the feature of the deformation of each portion, the bumper can deform in whole from its upper portion to its lower portion thereby to surely absorb the impact, and durability also improves.

In the thus structured bumper, an inner diameter of the upper portion (b1) may be substantially constant throughout an entirety of the upper portion (b), an inner diameter of the intermediate portion (b2) may be larger than the inner diameter of the upper portion (b1), and an inner diameter of the lower portion (b3) may be the same as or larger than the inner diameter of the intermediate portion (b2).

According to this structure, since the lower portion is comparatively small in volume, when the bumper is compressed by the impact from the upside, not only the upper portion but also the intermediate portion and the lower portion are easy to deform. Accordingly, since the deformation by the compression is transmitted from the upper portion to the lower portion, as long as the damper, when arranged in a cylinder, is accommodated so as to take advantage of the deformation feature based on the shape of each portion, the bumper can deform in whole from its upper portion to its lower portion thereby to absorb the impact surely. Further, since the compression is loaded on the whole of the bumper and the deformation is not applied to only a part, the durability can be improved.

In the thus structured bumper, an inner diameter of the upper portion (b1) may be substantially constant throughout an entirety of the upper portion (b1), and an inner diameter of the intermediate portion (b2) and an inner diameter of the lower portion (b3) may be substantially constant throughout an entirety of the intermediate portion (b2) and the lower portion (b2).

According to this structure, since the intermediate portion comparatively large in mass, the deformation of the intermediate portion upon reception of the impact is small.

In the above-structured bumper, the intermediate portion (b2) may have the largest outer diameter and the smallest inner diameter in an entirety of the bumper (20).

According to this structure, since the intermediate portion becomes a thick part which is large in volume, it is comparatively small in deformation by the impact in the driving time.

Further, in accordance with one or more embodiments of the invention, a driving tool (A) is provided with: a cylinder (6); a piston (7) slidabaly accommodated in the cylinder (6) and including a piston body (7*a*) and a driver fixing portion (7*b*); a driver (8) fixed to the driver fixing portion (7*b*); and a bumper (20) which is provided at a bottom of the cylinder (6), has a cylindrical overall shape, and has a space portion (S) expanding downward therein. The bumper (20) includes an upper portion (b1), an intermediate portion (b2), and a lower portion (b3). An inner diameter of the intermediate portion (b2) and an inner diameter of the lower portion (b3) are respectively larger than an outer diameter of the driver fixing portion (7*b*).

According to this structure, an air-gap portion is formed between the inner periphery surfaces of the bumper intermediate portion and the bumper lower portion, and an operating area of the driver fixing portion. Therefore, when the bumper deforms so as to infill the air-gap portion, the piston stops. As a result, when the bumper deforms, there is not produced such deformation that the inner periphery part of the bumper lower portion goes around the downside of the driver fixing portion. Further, the range of the air gap portion is large, which enables absorption of the entire bumper impact and effective prevention or reduction of damage of the inner periphery surface of the bumper lower portion.

Further, even in case that the range of the air-gap portion in the bumper is not made large because of piston structure or structural restriction in bumper volume on the basis of power of the driving tool, as long as the air-gap portion is formed between the inner periphery surface of the bumper and the driver fixing portion, it is possible to prevent effectively or reduce the damage of the inner periphery surface of the bumper lower portion.

In the above structure, a normal inclined-surface (23), in which an outer diameter becomes larger from an upper end of a full height of the bumper (20) toward a slightly upper position of the intermediate portion (b2), may be formed at a periphery of the upper portion (b1). A bulging-out portion (21) having the largest outer diameter in the bumper (20) may be bulged out, at a periphery of the intermediate portion (b2). A reverse inclined-surface (24), in which the outer diameter becomes smaller toward downward, may be formed at the periphery of the lower portion (b3). When the lower surface of the piston body (7*a*) comes into contact with the upper surface of the bumper (20), a first air-gap portion (s1) may be formed between an inner periphery surface of the bumper (20) and the driver fixing portion (7*b*), a second air-gap portion (s2) may be formed between the normal inclined surface (23) and the cylinder (6), and a third air-gap portion (s3) may be formed between the reverse inclined surface (24) and the cylinder (6).

According to this structure, in addition to the air-gap portion provided on the inside of the inner periphery surface of the bumper, the second air-gap portion is formed between the normal inclined-surface located at the upper periphery surface of the bumper and the cylinder, and the third air-gap portion is formed between the reverse inclined-surface located at the lower periphery surface thereof and the cylinder. As a result, by the normal inclined-surface located at the upper periphery surface, when the bumper is compressed from the upside, the upper portion is firstly compressed up and down and easy to undergo flexural deformation toward the outer second air-gap portion. Further, since the outer diameter decreases gradually due to the reverse inclined-surface located at the lower periphery surface, the lower portion is subjected to up-and-down compression-deformation and easy to undergo flexural deformation toward the outer third air-gap portion. Therefore, the bumper deforms in whole from its upper portion to its lower portion and can absorb the impact surely, and further the durability also improves.

Other aspects and advantages of the invention will be apparent from the following description and the appended claims.

DETAILED DESCRIPTION OF THE EXEMPLARY EMBODIMENTS

A driving tool (nailing machine) of an exemplary embodiment of the invention and a bumper of the driving tool will be described below with reference to FIGS. 1 to 4.

Figure 1:
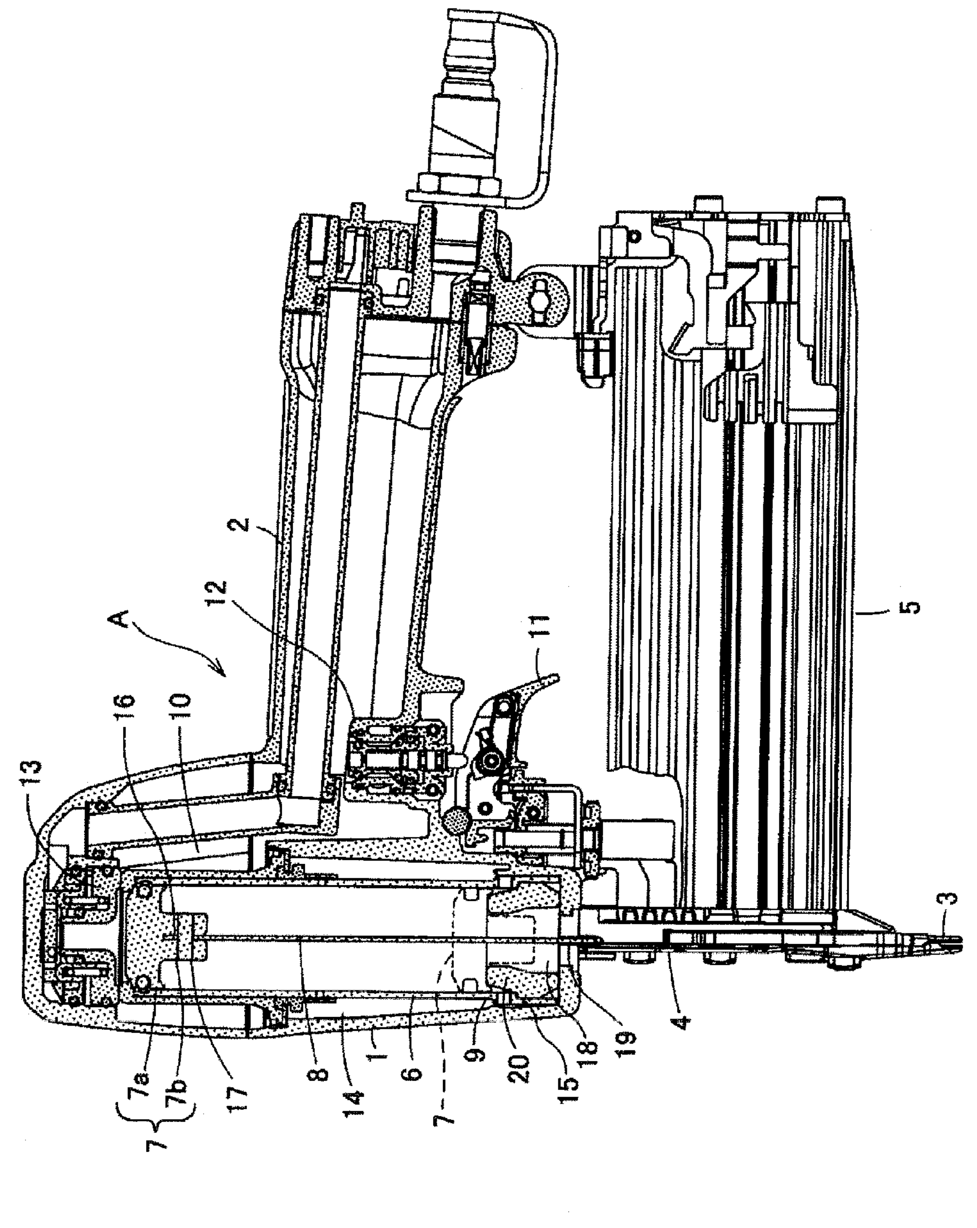
FIG. 1 is a longitudinal sectional view of a nailing machine according to an exemplary embodiment.

In FIG. 1, a reference symbol A denotes a nailing machine. In the nailing machine A, a grip 2 is integrally provided at a rear portion of a body 1. A nose portion 4 having an ejection port 3 is integrally provided at a lower portion of the body 1. A magazine 5 for supplying a nail to the ejection port 3 is provided at a rear portion of the nose portion 4. A drive part including a cylinder 6 and a piston 7 is provided in the body 1. The piston 7 is slidably accommodated in the cylinder 6. A driver (driving means) 8 is integrally coupled with the lower portion of the piston 7 and fixed to the piston 7. The driver 8 slides in the ejection port 3 of the nose portion 4.

Further, an air chamber 10, which stores therein compressed air supplied from a compressed air supply source (not shown) such as a not-shown air compressor, is formed in the body 1.

After a leading end of the nose portion 4 has been pressed against a member to be driven, a trigger lever 11 is pulled thereby to operate a startup valve 12. Then, a head valve 13 opens and operates, and the compressed air in the air chamber 10 is supplied to the upper surface of the piston 7 in the cylinder 6. Hereby, the piston 7 and the plate-shaped driver 8 are driven downward, and a nail (not shown) supplied from the magazine 5 to the ejection port 3 of the nose portion 4 is driven out.

Thereafter, by the air stored in a blowback chamber 14 around the cylinder 6, which has been compressed at the driving time, the piston 7 moves up and returns to an initial top dead center position, and the next nail-driving operation is prepared.

At the lower portion of the cylinder 6, a step 15 is formed. Further, just above the step 15, an exhaust port 9 communicating with the blowback chamber 14 is through-formed. At the bottom of the cylinder 6, a guide groove 19 for the driver 8 is formed.

Figure 3:
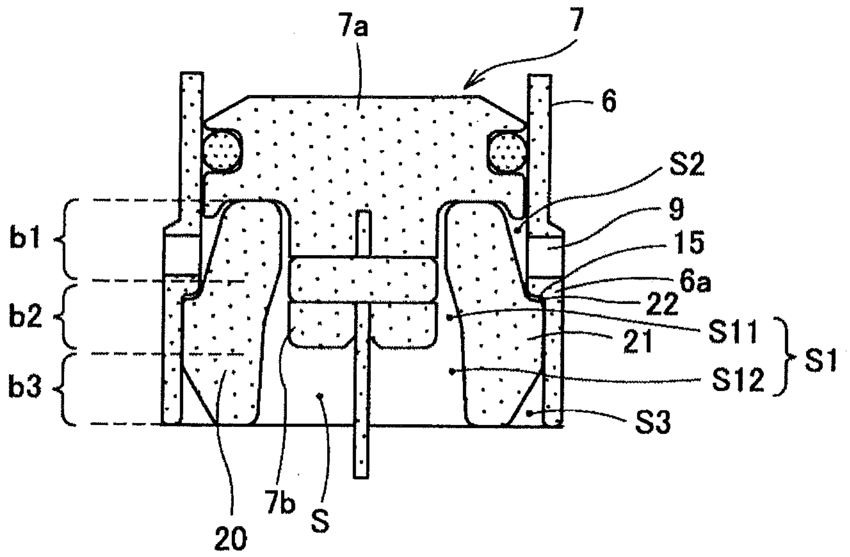
FIG. 3 is an enlarged sectional view of a main part, showing a mounting state of the above bumper.

The piston 7, as shown in FIG. 1 and FIG. 3, includes a large-diameter piston body 7*a* and a small-diameter driver fixing portion 7*b* located under the piston body 7*a*. In the center of the driver fixing portion 7*b*, a fitting groove 16 which opens downward is provided. Into this fitting groove 16, the driver 8 is fitted. The driver 8 is integrally coupled to the piston 7 by a fixing pin 17 which gets across the driver fixing portion 7*b*.

At the bottom of the cylinder 6, a bumper housing 18 is formed. In the bumper housing 18, a bumper (cushioning member) 20 is accommodated, which receives the lower surface of the piston driven downward in the nail driving time.

Figure 2:
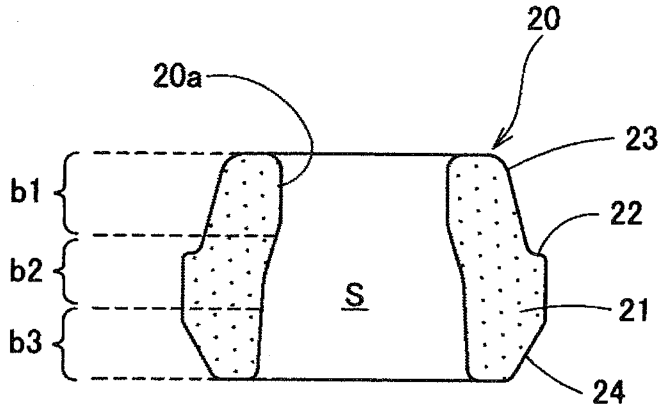
FIG. 2 is an enlarged longitudinal sectional view of a bumper portion.

As shown in FIG. 2, the bumper 20 is a short cylindrical member made of elastic material such as rubber. Inside the bumper 20, a space portion S expanding downward is formed. A lower portion b3 is slightly larger in inner diameter than an upper portion b1. Further, though the inner diameter of an opening portion 20*a* formed in an upper-end central portion of the bumper 20 is smallest, it is formed so that its inner diameter becomes slightly larger than the outer diameter of the driver fixing portion 7*b* of the piston 7. The inner periphery surface of the bumper 20 is formed so that the inner diameter of the lower portion b3 becomes larger than the inner diameter of the upper portion b1. Further, the largest inner diameter of an intermediate portion b2 is formed so as to be larger than the largest inner diameter of the upper portion b1, and be the same as or smaller than the smallest inner diameter of the lower portion b3. Namely, the inner shape of the intermediate portion b2 is formed so as to be larger than the inner shape of the upper portion b1, the inner shape of the lower portion b3 is formed so as to be the same as or larger than the inner shape of the intermediate portion b2, and the large space portion S expanding downward is formed inside the bumper 20. Furthermore, the inner diameter of the upper portion b1 is substantially the same to about ⅓ height of full height, and the inner periphery surface of the upper portion b1 is formed perpendicularly. The inner diameter of the intermediate portion b2 below the upper portion b1 increases comparatively sharply to about ½ height of full height. The inner diameter of the lower portion b3 below the intermediate portion b2 increases a little to the lower end, and the inner periphery surface of the lower portion b3 becomes an inclined surface which is approximately perpendicular.

On the other hand, at the upper portion b1 on the peripheral surface of the bumper 20, a normal inclined-surface 23 is formed, in which the outer diameter increases from the upper end of the full height to the upper position of the intermediate portion b2. Further, at the intermediate portion b2, a bulging-out portion 21 which has the largest outer diameter is formed and bulges outward. The bulging-out portion 21 extends to the lower portion b3 which is in lower ⅓ height of the full height. At a peripheral upper end of the bulging-out portion 21, a step 22 is formed. The peripheral surface of the lower portion b3 is formed as a reverse inclined-surface 24 in which the outer diameter decreases gradually.

As described above, the space portion S which expands downward is formed inside the bumper 20. Further, at the upper portion b1, the normal inclined-surface 23 in which the outer diameter increases is formed; and at the lower portion b3, the reverse inclined-surface 24 in which the outer diameter decreases gradually is formed. Therefore, in the structure of the bumper, since the volume of the lower portion b3 is relatively small, when the bumper 20 is compressed by the impact from the upside, not only the upper portion b1 but also the intermediate portion b2 and the lower portion b3 are easy to deform. Accordingly, the deformation due to the compression is transmitted from the upper portion b1 to the lower portion b3. Therefore, when the bumper 20 is arranged in the cylinder 6, the bumper 20 is accommodated so as to take advantage of deformation feature based of the shape of the above each portion as shown in FIG. 1 and FIG. 3, whereby the bumper 20 deforms in whole from the upper portion b1 to the lower portion b3 and can surely absorb the impact. Further, since the compression is loaded on the entirety of the bumper 20 and the deformation is not applied to only a part, the durability can be improved.

When the thus-structured bumper 20 is accommodated and arranged at the lower portion of the cylinder 6, as shown in FIG. 1 and FIG. 3, the peripheral step 22 of the bumper 20 is fitted to the step 15 of the large-diameter portion 6*a*, and the peripheral surface of the bumper 20 is brought into contact with an inner wall of the cylinder 6. Further, the bumper 20 is arranged so that: between the inner periphery surfaces of the inter mediate portion b2 and the lower portion b3, and the operating area (dotted line) of the driver fixing portion 7*b* of the piston 7, a first air-gap portion s1 is formed; between the normal inclined surface 23 of the peripheral upper portion b1 of the bumper 20 and the inner wall of the cylinder 6, a second air-gap portion s2 is formed, and between the peripheral surface (reverse inclined surface 24) of the lower portion b3 of the bumper 20 and the inner wall of the cylinder 6, a third air-gap portion 3 is formed.

The lower end surface of the driver fixing portion 7*b* when the lower surface of the piston body 7*a* of the piston 7 comes into contact with the upper surface of the bumper 20 is set to be located substantially in a boundary between the intermediate portion b2 of the bumper 20 and the lower portion b3.

Of the first air-gap portion s1 formed inside the bumper 20, an air-gap portion formed between the driver fixing portion 7*b* and the inner periphery surface of the bumper 20 when the lower surface of the piston body 7*a* of the piston 7 comes into contact with the upper surface of the bumper 20 in the driving time is taken as a first air-gap upper portion (inner air-gap upper portion) s11, and an air-gap portion formed between the operating area of the driver fixing portion 7*b* when the piston 7 descends up to a bottom dead center after the contact and the inner periphery surface of the bumper is taken as a first air-gap lower portion (inner air-gap lower portion) s12.

By forming the first air-gap upper portion s11, the damage of the inner periphery surface of the bumper lower portion b3 can be effectively prevented or reduced even in case that a wide range is not secured as the air-gap portion of the bumper 20 because of the piston structure or structural restriction in bumper volume due to power of the nailing machine.

Figure 4A:
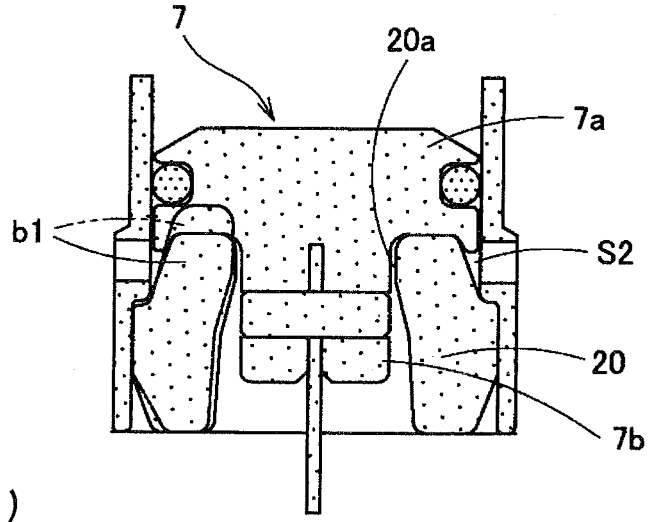
FIGS. 4(*a*) to 4(*c*) are diagrams showing a deformation state due to flexure of the bumper, in which FIG. 4(*a*) is a diagram showing a bumper state immediately after the impact of the driven piston against the bumper, FIG. 4(*b*) is a diagram showing a deformation state of the bumper when the bumper is pressed downward by the impact of the above piston, and FIG. 4(*c*) is a diagram showing a deformation state of the bumper in a final stage when the above piston reaches a bottom dead center.
Figure 4B:
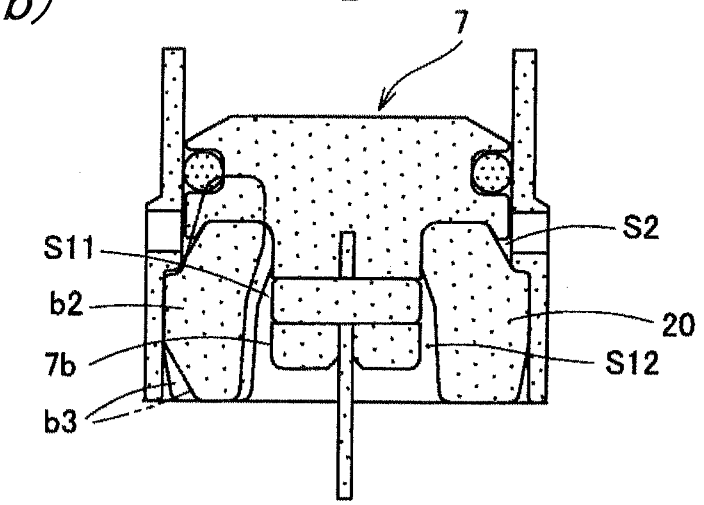
Figure 4C:
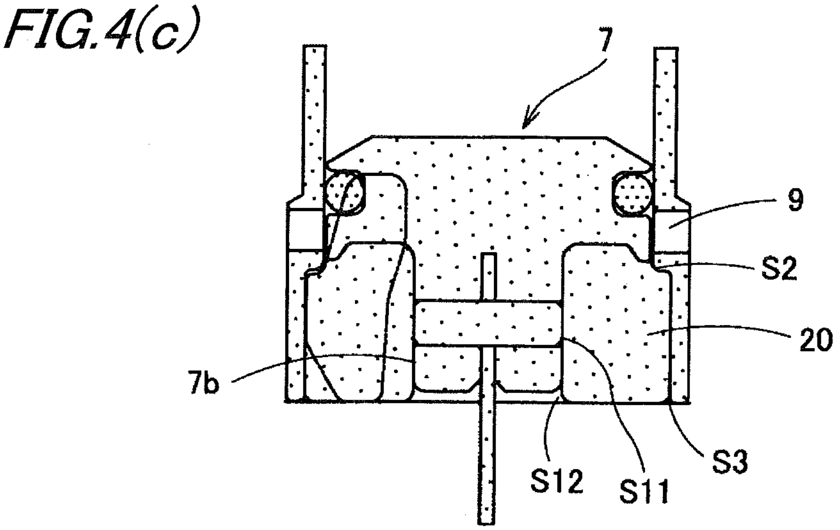

Next, the working of the above bumper 20 will be described. When the piston 7 is driven downward by the compressed air supplied in the cylinder 6, the driver fixing portion 7*b* of the piston 7 is inserted from the opening portion 20*a* of the bumper 20 into the inner space portion S of the upper portion b1, and the lower surface of the piston body 7*a* bumps impactively against the upper end portion of the bumper 20. Hereby, as shown in FIG. 4(*a*), firstly, the upper portion b1 of the bumper is compressed and subjected to flexure-deformation. Simultaneously, the upper portion b1 deforms so as to bulge onto the first air-gap portion s1 side, and this deformation is transmitted to the intermediate portion b2. A chain double-dashed line shows a state before the deformation. As shown in FIG. 4(*b*), also at the intermediate portion b2, the bumper similarly deforms in the up-down direction. Since the intermediate portion b2 is relatively large in mass, the degree of deformation is small. Simultaneously, the inner periphery surface of the intermediate portion b2 bulges onto the first air-gap upper portion s11 side thereby to abut on the peripheral surface of the driver fixing portion 7*b* of the piston 7. Further, by the above impact, the lower portion b3 is also compressed and deforms. Simultaneously, the lower portion b3, which is thin, bulges and deforms onto the outer third air-gap portion s3 side and the inner first air-gap lower portion 12 side (refer to FIG. 4(*c*)).

As described above, since the first air-gap portion s1 is formed between the inner peripheral surfaces of the intermediate portion b2 of the bumper 20 and the lower portion b3 thereof, and the operating area of the driver fixing portion 7*b* of the piston 7, when the bumper 20 deforms so as to infill the first air-gap portion s1, the piston 7 stops. Therefore, in the deformation time, the bumper does not so deform that the inner peripheral surface of the bumper lower portion b3 goes around the lower surface side of the driver fixing portion 7*b* of the piston 7. Further, the range of the first air-gap portion s1 is large, which enables the absorption of the entire bumper impact and effective prevention or reduction of the damage in the inner peripheral surface of the bumper lower portion b3.

Figure 5:
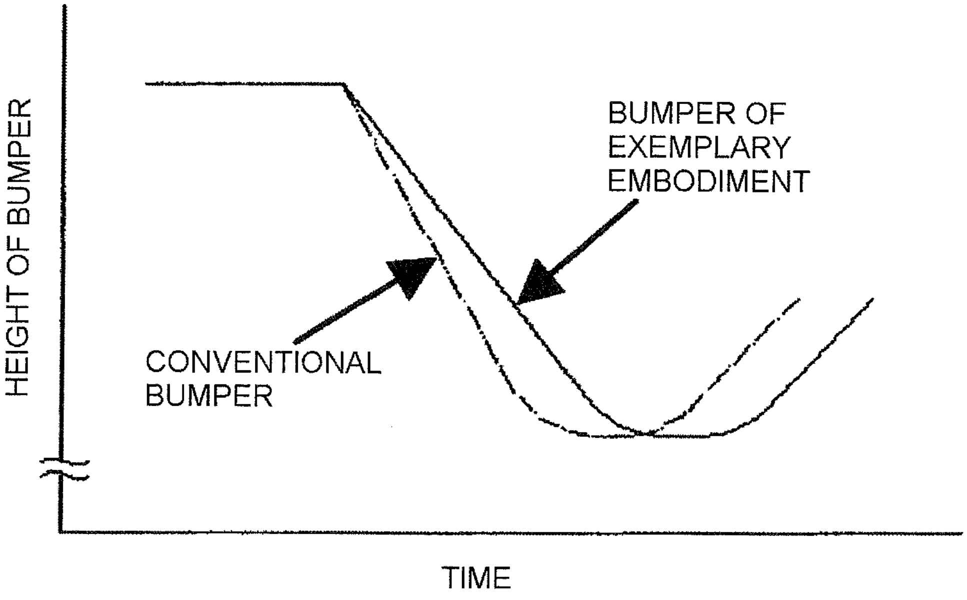
FIG. 5 is a graphical diagram showing comparison of time from start of compression to completion of compression between a bumper in an exemplary embodiment and a conventional bumper.

Further, regarding the inner shape of the bumper 20, the lower portion b3 is larger than the upper portion b1, with the result that the large space portion S is formed inside the bumper 20 and the air-gap portions s1 to s3 are formed inside and outside the bumper 20. Therefore, under this structure, when the bumper 20 is compressed, it readily deforms not only in the up-down direction but also in the radial direction. Namely, the upper portion b1 deforms outward because the second air-gap portion s2 exists outside the upper portion b1, the intermediate portion b2 deforms inward to the contrary because the first air-gap upper portion s11 exists only inside the intermediate portion b2, and the lower portion b3 undergoes the flexure-deformation inward and outward because the first air-gap lower portion s12 and the third air-gap portion s3 exist inside and outside the lower portion. As described above, by utilizing efficiently the space between the cylinder 6 and the piston 7, the bumper 20 undergoes the flexure-deformation in the radial direction and the up-down direction. Accordingly, since the deformation by the compression is transmitted from the upper portion b1 to the lower portion b3, the impact is correspondingly slowly received and absorbed. When the time from the impact reception to the impact absorption was actually measured in the above bumper and in the conventional bumper to check difference between the bumpers, an experimental result shown in FIG. 5 was obtained. In the conventional bumper, a tendency for only the upper portion or only the lower portion to receive and absorb the load by the impact is strong. Accordingly, since the above bumper 20 can deform in whole from the upper portion b1 to the lower portion b3 thereby to surely enable the impact absorption and is excellent in durability, and further inertial force acting on the driver 8 is reduced, safety factor on strength between the driver 8 and the driver fixing portion 7*b* can be improved.

Further, when the upper portion b1 of the bumper 20 undergoes the flexure-deformation upon reception of the impact, since the peripheral surface of the upper portion b1 is the normal inclined surface 23, the peripheral surface does not comes into contact the cylinder 6 while sliding along the wall surface of the cylinder 6 but deforms in the radial direction while being compressed in the up-down direction. Accordingly, the above peripheral surface comes into contact with the cylinder 6 at last of the compression. Therefore, the upper portion b1 does not come into contact with the exhaust port 9 communicating with the blowback chamber 14. Further, since the third air-gap portion s3, the first air-gap upper portion s11 and the first air-gap lower portion s12 are formed outside and inside the lower portion b3 of the bumper 20, when the bumper 20 deforms so as to infill not only the second air-gap portion s2 but also the third air-gap portion s3, the first air-gap upper portion s11 and the first air-gap lower portion s12, the piston 7 stops. Therefore, in the deformation time, the bumper does not so deform that the inner peripheral surface of the lower portion b3 goes around the lower surface side of the driver fixing portion 7*b* of the piston 7. Accordingly, it is possible to effectively prevent or reduce the damage in the peripheral surface of the bumper upper portion b1 and the inner peripheral surface of the bumper lower portion b3. Thus, since deterioration and damage in only one part are not produced, the durability of the bumper is kept good.

Figure 6:
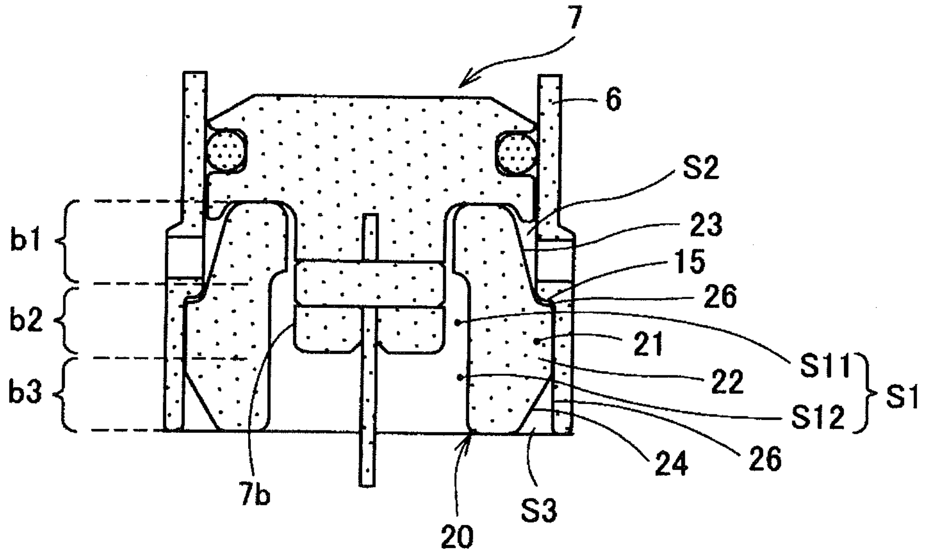
FIG. 6 is a longitudinal sectional view of a bumper according to a first modified example of the exemplary embodiment.

Next, a first modified example of the exemplary embodiment will be shown in FIG. 6. The inner diameter of an upper portion b1 of a bumper 20 is substantially the same throughout the entire area of the upper portion, the inner peripheral surface of the upper portion b1 is formed perpendicularly, the inner diameter of the portion below the upper portion b1 increases sharply at an intermediate portion b2, and the inner diameter is substantially the same throughout the entire area of the intermediate portion b2 and throughout the entire area of a lower portion b3. Further, at the upper portion of the periphery surface, a normal inclined-surface 23 is formed, in which the outer diameter increases from an upper end of the full height to the upper position of the intermediate portion b2, and a bulging-out portion 21 of the intermediate portion b2, which has the largest outer diameter, extends to the upper portion of the lower portion b3. The periphery surface of the lower portion b3 is formed as a reverse inclined-surface 24 in which the outer diameter decreases gradually.

Further, between the bumper 20 and the inner wall of a cylinder 6, and between the bumper 20 and the peripheral surface of a piston 7, similarly to the case in the above-mentioned embodiment, a first air-gap portion s1 to a third air-gap portion s3 are formed.

Figure 7A:
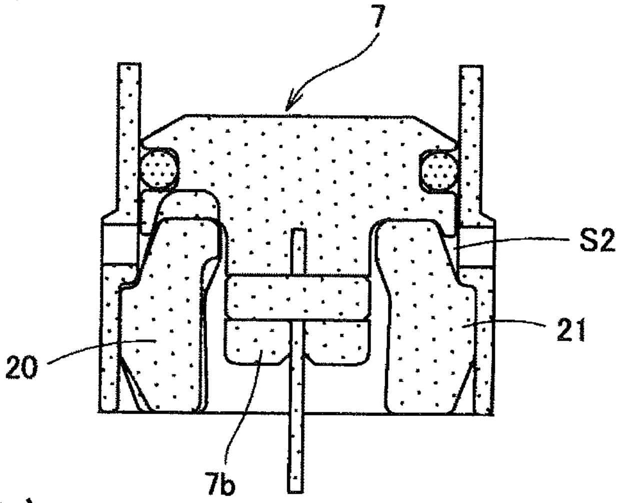
FIGS. 7(*a*) to 7(*c*) are diagrams showing a deformation state due to flexure of the bumper in the first modified example, in which FIG. 7(*a*) is a diagram showing a bumper state immediately after the impact of the driven piston against the bumper, FIG. 7(*b*) is a diagram showing a deformation state of the bumper when the bumper is pressed downward by the impact of the above piston, and FIG. 7 (*c*) is a diagram showing a deformation state of the bumper in a final stage when the above piston reaches a bottom dead center.
Figure 7B:
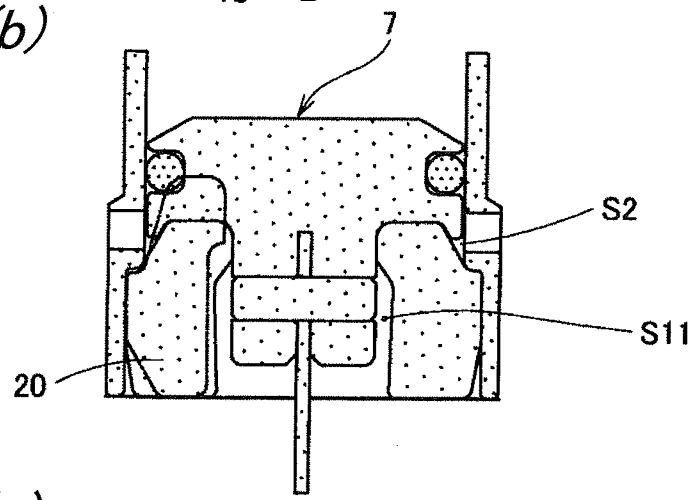
Figure 7C:
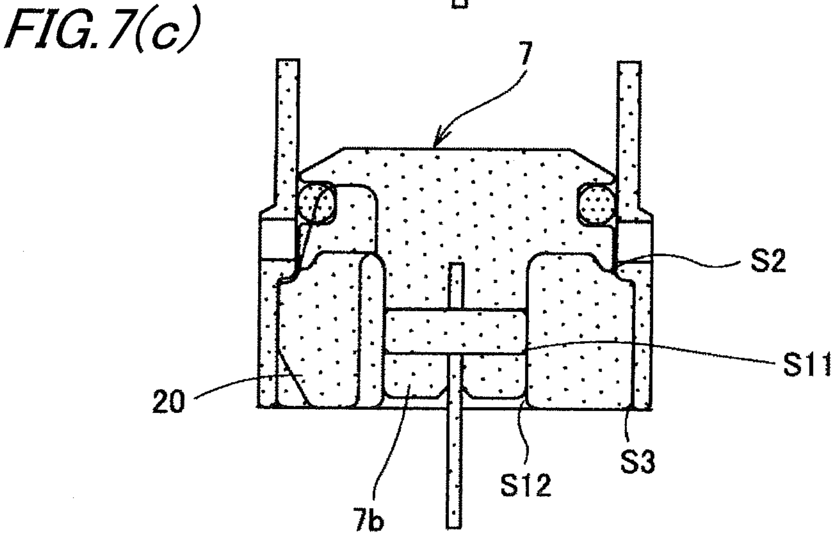

According to the above constitution, volume balance of the upper portion b1, the intermediate portion b2 and the lower portion b3 is substantially the same as that in the embodiment in FIG. 2. Therefore, the bumper 20 is compressed as shown in FIG. 7(*a*), FIG. 7(*b*) and FIG. 7(*c*). Accordingly, an advantage similar to that in the case of the bumper 20 in FIG. 2 is obtained.

The same members as those in the embodiment in FIG. 2 are denoted by the same symbols. The same applies to the following modified examples.

Figure 8:
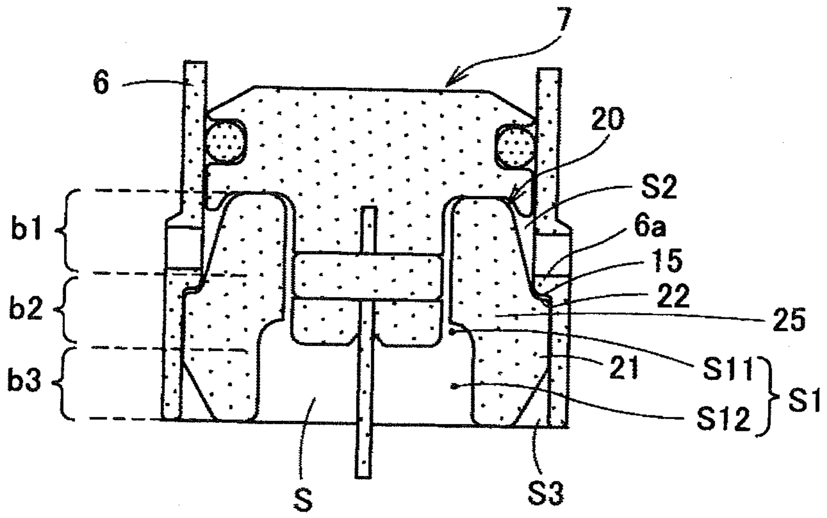
FIG. 8 is a longitudinal sectional view of a bumper according to a second modified example of the exemplary embodiment.

Next, FIG. 8 shows a bumper 20 in a second modified example of the exemplary embodiment. The peripheral surface of the bumper 20 is the same as that in the exemplary embodiment. To the contrary, regarding an inner space S of the bumper 20, an upper half portion of the full height of the bumper 20 is formed smaller in diameter than a lower half portion thereof. Further, the inner diameter of the upper half portion is the same throughout the entirety of the upper half portion, and the inner diameter of the lower half portion is the same throughout the entirety of the upper half portion. Therefore, an intermediate portion b2 has a thick portion 25 in which the smallest inner diameter and the largest outer diameter exist together. The thick portion 25 is, of an upper half portion of the intermediate portion b2, a lower half portion. Accordingly, the thick portion 25 has the largest structure in volume. Further, between the bumper 20 and the inner wall of a cylinder 6, and between the bumper 20 and a driver fixing portion 7*b* of a piston 7, a first air-gap portion s1 to a third air-gap portion s3 are formed.

Figure 9A:
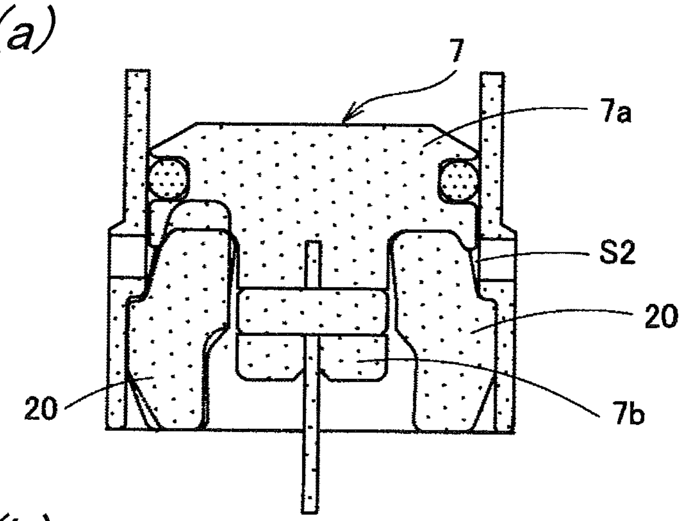
FIGS. 9(*a*) to 9(*c*) are diagrams showing a deformation state due to flexure of the bumper in the second modified example, in which FIG. 9(*a*) is a diagram showing a bumper state immediately after the impact of the driven piston against the bumper, FIG. 9(*b*) is a diagram showing a deformation state of the bumper when the bumper is pressed downward by the impact of the above piston and deforms, and FIG. 9(*c*) is a diagram showing a deformation state of the bumper in a final stage when the above piston reaches a bottom dead center.
Figure 9B:
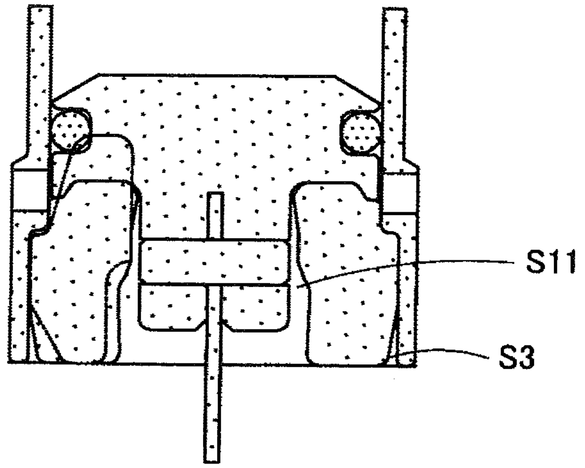
Figure 9C:
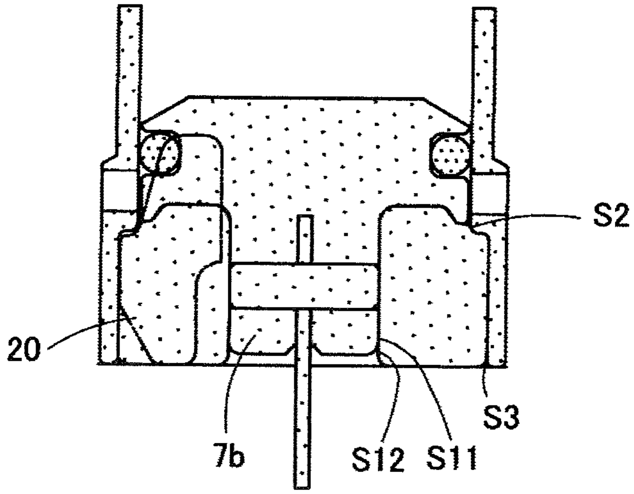

Here, the working of the above bumper 20 will be described with reference to FIG. 9(*a*), FIG. 9(*b*), and FIG. 9(*c*). When the piston 7 is driven downward, and the lower surface of the piston body 7*a* bumps impactively against the upper end portion of the bumper 20 as shown in FIG. 9(*a*), the upper portion b1 of the bumper 20 is subjected to flexure-deformation in the up-down direction and deforms to the first air-gap portion s1 side. This deformation is transmitted to the intermediate portion b2, and the intermediate portion b2 also deforms similarly. Since the intermediate portion b2 is relatively large in mass, and the first air-gap upper portion s11 which absorbs the deformation is small, the deformation of the intermediate portion b2 is also small as shown in FIG. 9(*b*). Sequentially, when the bumper 20 is further compressed in the up-down direction as shown in FIG. 9(*c*), the lower portion b3 of the bumper 20 simultaneously deforms to the inner first air-gap lower portion 12 side and to the outer third air-gap portion s3.

Thus, in the above bumper 20, the deformation of the intermediate portion b2 is smaller than each deformation of the upper portion b1 and the lower portion b3, but the advantage substantially similar to that in the bumper 20 in FIG. 2 is obtained.

Figure 10:
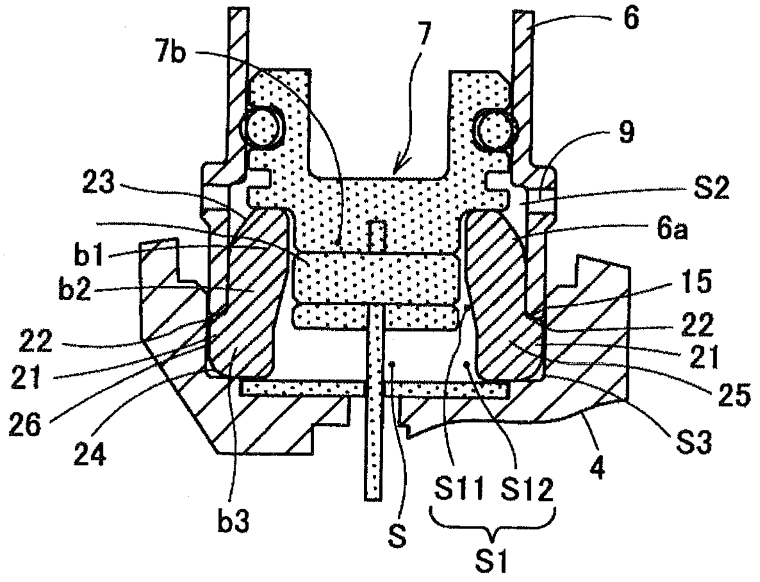
FIG. 10 is a longitudinal sectional view of a cylinder and a damper in a third modified example.

Further, FIG. 10 shows a cylinder 6, a piston 7 and a bumper 20 in a third modified example of the exemplary embodiment. In the cylinder 6, an exhaust port 9 is formed at a large-diameter portion 6*a* located at the lower portion thereof. Further, the lower end portion of the cylinder 6 is fitted into a recess portion 26 formed at the upper portion of a nose portion 4, a bottom portion of the cylinder 6 is constituted by this recess portion 26, and a step 15 is formed between the lower end portion of the cylinder 6 and the recess portion 26.

The bumper 20 is cylindrical in whole, and forms therein a space portion S expanding downward. On the peripheral surface of an upper portion b1, a normal inclined-surface 23 is formed, in which the outer diameter increases from the upper end of the full height to the slightly upper position of an intermediate portion. At a lower portion b3, there is formed a bulging-out portion 21 having the largest outer diameter. In this point on the shape, the bumper in the third modified example is different from each of the above-mentioned bumpers.

When the bumper 20 is arranged in the cylinder 6, a step 22 of the bulging-out portion 21 of the bumper 20 engages with the step 15 at the bottom portion of the cylinder 6, and the peripheral surface of the bumper comes into contact with the inner wall of the cylinder 6. Between the bumper 20 and the inner wall of the cylinder 6, and between the bumper 20 and a driver fixing portion 7*b* of the piston 7, first air-gap portion s1 to a third air-gap portion s3 are also formed. The third air-gap portion s3 is small, compared with each air-gap portion s3 in the above-mentioned third examples.

In this case, since the normal inclined surface 23 is formed on the peripheral surface of the upper portion b1 from the upper end of the full height to the slightly upper position of the intermediate portion, the upper portion b1 of the bumper 20, even in case that it undergoes compression-deformation, does not come into contact with the exhaust port 9, and the advantage substantially similar to that in the bumper 20 in FIG. 2 is obtained.

While description has been made in connection with a specific exemplary embodiment and modified examples thereof, it will be obvious to those skilled in the art that various changes and modifications may be made therein without departing from the present invention. It is aimed, therefore, to cover in the appended claims all such changes and modifications falling within the true spirit and scope of the present invention.

DESCRIPTION OF REFERENCE NUMERALS AND SIGNS b1 Upper portion
b2 Intermediate portion
b3 Lower portion
S Space portion
s1 First air-gap portion
s11 First air-gap upper portion
s12 First air-gap lower portion
s2 Second air-gap portion
s3 Third air-gap portion

6 Driving cylinder
7 Driving piston
7*a* Piston body
7*b* Driver fixing part
8 Driver
20 Bumper

What is claimed is:

1. A driving tool comprising:

a cylinder;

a piston slidably accommodated in the cylinder and including a piston body and a driver fixing portion;

a driver fixed to the driver fixing portion; and a bumper which is provided at a bottom of the cylinder, wherein the bumper defines an elongated annulus, the annulus being concentrically disposed around a longitudinal axis of an open space defined by an inner wall of the elongated annulus extending through the bumper from an upper end of the bumper to a lower end of the bumper, the bumper including an upper portion concentrically disposed around the longitudinal axis of the open space and extending from the upper end of the bumper;

a lower portion concentrically disposed around the longitudinal axis of the open space and extending from the lower end of the bumper; and an intermediate portion concentrically disposed around the longitudinal axis of the open space and extending between the upper portion of the bumper and the lower portion of the bumper;

wherein the open space expands from the upper portion of the bumper to the lower portion of the bumper such that a cross-sectional area of the open space perpendicular to the longitudinal axis in the lower portion of the bumper is larger than a cross-sectional area of the open space perpendicular to the longitudinal axis in the upper portion of the bumper, wherein an inner diameter of the intermediate portion and an inner diameter of the lower portion are respectively larger than an outer diameter of the driver fixing portion, wherein a normal inclined-surface, in which an outer diameter becomes larger from the upper end of the bumper toward an upper position of the intermediate portion, is formed at a periphery of the upper portion, wherein a bulging-out portion having the largest outer diameter in the bumper is bulged out, at a periphery of the intermediate portion, wherein a reverse inclined-surface, in which the outer diameter becomes smaller toward the lower end of the bumper, is formed at the periphery of the lower portion, and wherein, when the lower surface of the piston body comes into contact with the upper surface of the bumper, a first air-gap portion is formed between an inner periphery surface of the bumper and the driver fixing portion, a second air-gap portion is formed between the normal inclined surface and the cylinder, and a third air-gap portion is formed between the reverse inclined surface and the cylinder.

2. The driving tool according to claim 1, wherein an inner diameter of the upper portion is substantially constant throughout an entirety of the upper portion, wherein the inner diameter of the intermediate portion is larger than the inner diameter of the upper portion, and the inner diameter of the lower portion is the same as or larger than the inner diameter of the intermediate portion.

3. The driving tool according to claim 1, wherein an inner diameter of the upper portion is substantially constant throughout an entirety of the upper portion, and the inner diameter of the intermediate portion and the inner diameter of the lower portion are substantially constant throughout an entirety of the intermediate portion and the lower portion.

4. The driving tool according to claim 1, wherein the intermediate portion has a largest outer diameter and a smallest inner diameter in an entirety of the bumper.

* * * * *